(12) United States Patent
Sakai

(10) Patent No.: US 6,651,029 B2
(45) Date of Patent: Nov. 18, 2003

(54) APPARATUS AND METHOD FOR MEASURING SURFACE SHAPE

(75) Inventor: Hiroshi Sakai, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/002,162

(22) Filed: Dec. 5, 2001

(65) Prior Publication Data
US 2002/0082804 A1 Jun. 27, 2002

(30) Foreign Application Priority Data
Dec. 5, 2000 (JP) ........................................ 2000-369348

(51) Int. Cl.[7] .............................................. G06F 15/00
(52) U.S. Cl. ........................................ 702/167; 33/554
(58) Field of Search ............................ 702/167, 33, 36, 702/94, 95, 150–153, 155, 157, 168, FOR 123, FOR 124, FOR 134, FOR 136, FOR 144, FOR 147, FOR 170; 700/194, 187, 189; 33/121, 551, 503, 554; 703/1, 2, 7, 5

(56) References Cited

U.S. PATENT DOCUMENTS 6,032,377 A * 3/2000 Ichikawa et al. .............. 33/554
6,260,000 B1 * 7/2001 Karasaki et al. ............. 702/155

* cited by examiner

Primary Examiner—John Barlow
Assistant Examiner—Xiuqin Sun
(74) Attorney, Agent, or Firm—Sughrue Mion, PLLC

(57) ABSTRACT

The surface shape measuring apparatus comprises a polar coordinate conversion portion for converting the orthogonal coordinate data representing the surface shape of a measurement object into the polar coordinate data, an approximate expression calculating portion for calculating an approximate expression on the basis of the polar coordinate data employing the Zernike's polynomial, an angle calculating portion for calculating angles representing the generating line and principal directions, a first approximate sectional shape calculating portion for calculating approximate sectional shapes in the generating line and principal line directions based on the calculated angles, a second approximate sectional shape calculating portion for calculating the center coordinates and the radiuses of curvature for the approximate sectional shapes, and a sectional shape data calculating portion for calculating the numerical data of approximate sectional shapes in the generating line and principal line directions on the basis of the center coordinates and the radiuses of curvature.

8 Claims, 3 Drawing Sheets

APPARATUS AND METHOD FOR MEASURING SURFACE SHAPE

BACKGROUND OF THE INVENTION

1. Field of the Invention

The present invention relates to a surface shape measuring apparatus used to measure the shape of a curved surface for an aspherical lens or the like.

2. Description of Related Art

The surface shape measuring apparatus used to measure the shape of a curved surface for a lens or the like is configured to measure the radius of curvature, in the case where the surface shape of a measurement object is approximated with a two dimensional shape, whether in tracer type or non-tracer type.

For example, by tracing the surface of the measurement object with a probe (two dimensional scanning), the two dimensional data (x, z) around an origin in the two dimensional orthogonal coordinates as predefined is measured. Then, by fitting the obtained data to a general expression (1) of a circle by the method of least square, the coefficients g, h and c defining the circle are calculated. On the basis of the obtained coefficients g, h and c, the center coordinates (−g, −h) of the circle are calculated, and the radius of curvature is calculated in accordance with an expression (2).

$$-c = x^2 + z^2 + 2gx + 2hz \quad (1)$$

$$\text{radius} = \sqrt{(g^2 + h^2 - c)} \quad (2)$$

In the three dimensional measurement, the surface roughness (RA) and the minimum-maximum value (P-V value) are additionally measured.

Conventionally, in the three dimensional measurement, there are some measuring instruments for measuring the three dimensional wave front phase such as an interferometer which calculate and represent the wave front phase configuration as the amount of astigmatism. However, no measuring instrument has been proposed which measures the surface shape for a three dimensional curved surface shape such as a cylindrical or toroidal shape as the radiuses of curvature in the generating line and principal line direction and calculates the surface shape.

Thus, it is considered that the shape data of the three dimensional surface of the measurement object is acquired by two dimensional scanning, employing the conventional two dimensional measuring instrument. In this case, however, the curved surface shape that is not in rotation symmetry such as a cylindrical or toroidal shape is often unknown in the generating line direction or principal line direction. If the two dimensional scanning is not made along the generating line or principal line direction, an error occurs in calculating the radius of curvature that is caused by an angle error in its scanning direction, resulting in incorrect scanning and measurement.

SUMMARY OF THE INVENTION

In the light of the above-mentioned problems, it is an object of the present invention to provide a surface shape measuring apparatus and method in which the surface shape of a measured object having unknown principal line or generating line is approximated with a quadratic curve such as a circle, an ellipse, a hyperbolic function or a quadratic function, and the surface shape of the measurement object is represented as a numerical value, on the basis of the center coordinates and the radius of curvature for the approximated quadratic curve.

In order to accomplish the above object, according to one aspect of the present invention, there is provided a surface shape measuring apparatus, characterized by polar coordinate conversion means for converting the surface shape data of a measurement object represented as the three dimensional orthogonal coordinate data (x, y, z) into the polar coordinate data (z, ρ, θ); approximate expression calculating means for calculating an approximate expression for the surface shape of the measurement object on the basis of the polar coordinate data, employing a polynomial for approximating the curved surface; angle calculating means for calculating an angle θ1 representing the generating line direction and an angle θ2 representing the principal line direction in the surface shape of the measurement object in accordance with the approximate expression; first approximate sectional shape calculating means for calculating first approximate sectional shapes both in the generating line and principal line directions on the surface shape of the measurement object on the basis of the angles θ1 and θ2 employing the approximate expression; second approximate sectional shapes calculating means for approximating the first approximate sectional shapes to the quadratic curves with respect to the three dimensional orthogonal coordinates as second approximate sectional shapes, and calculating the center coordinates and the radiuses of curvature for the approximate quadratic curves representing the second approximate sectional shapes in the generating line and principal line directions; and sectional shape data calculating means for calculating numerical data of the second approximate sectional shapes both in the generating line and principal line directions and on the surface shape of the measurement object on the basis of the center coordinates and the radiuses of curvature for the approximate quadratic curves.

The approximate expression may be a Zernike's polynomial including at least up to nine terms.

According to another aspect of the invention, there is provided A surface shape measuring method comprising the steps of: converting the surface shape data of a measurement object represented as the three dimensional orthogonal coordinate data (x, y, z) into the polar coordinate data (z, ρ, θ); calculating an approximate expression for the surface shape of the measurement object on the basis of the polar coordinate data employing a polynomial for approximating the curved surface; calculating an angle θ1 representing the generating line direction and an angle θ2 representing the principal line direction in the surface shape of the measurement object in accordance with the approximate expression; calculating first approximate sectional shapes both in the generating line and principal line directions on the surface shape of the measurement object on the basis of the calculated angles θ1 and θ2, employing the approximate expression; approximating the first approximate sectional shapes both in the generating line and principal line directions to quadratic curves with respect to the three dimensional orthogonal coordinates as second approximate sectional shapes and calculating respective center coordinates and the radiuses of curvature for the approximate quadratic curves; and calculating numerical data of the second approximate sectional shapes both in the generating line and principal line directions in the surface shape of the measurement object, on the basis of the center coordinates and the radiuses of curvature for the approximate quadratic curves.

The approximate expression may be a Zernike's polynomial including at least up to nine terms.

DETAILED DESCRIPTION OF THE PREFERRED EMBODIMENTS

The preferred embodiments of the present invention will be described below with reference to the accompanying drawings.

Figure 1:
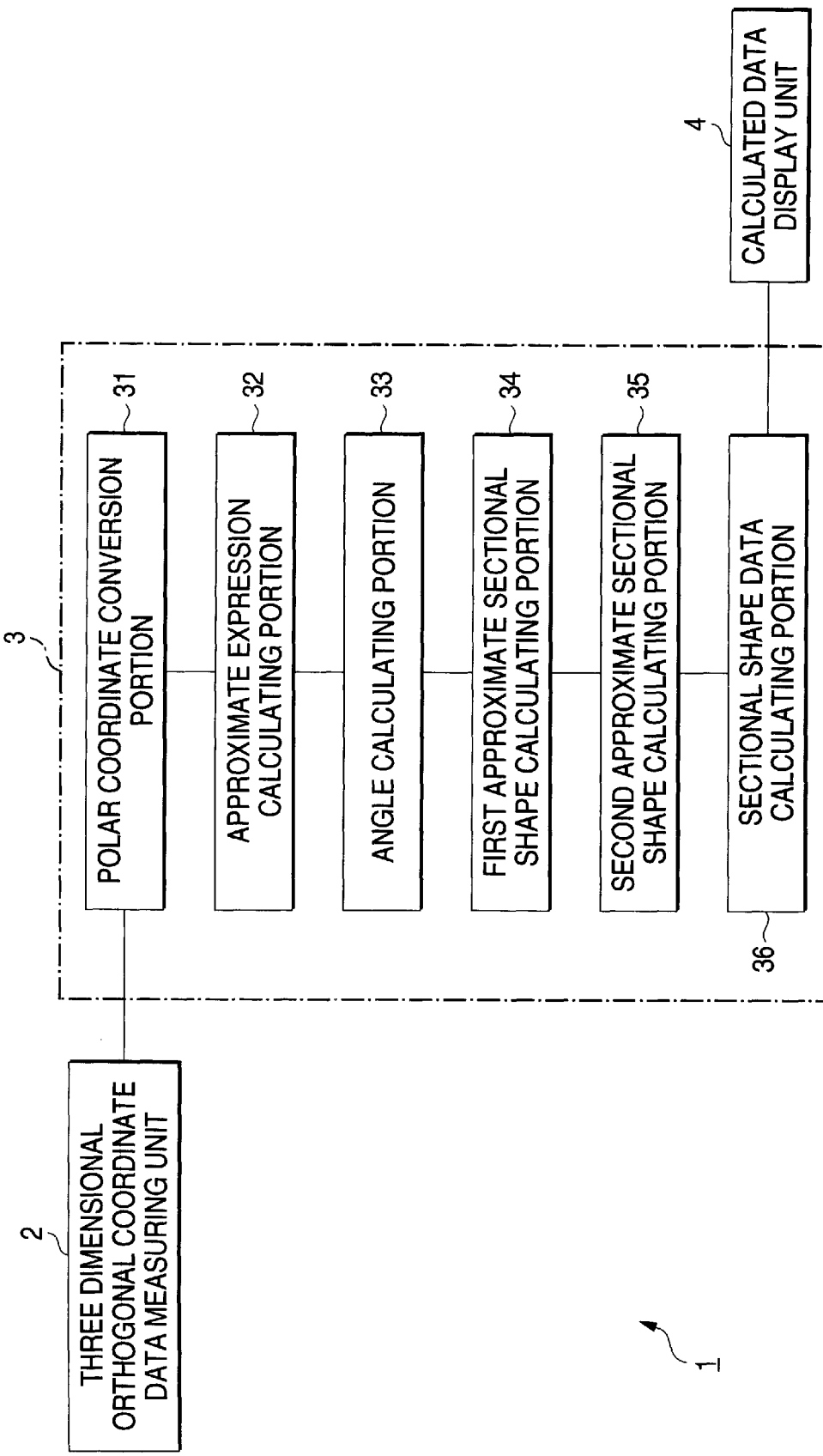
FIG. 1 is a schematic block diagram showing a surface shape measuring apparatus of the present invention.

FIG. 1 is a schematic block diagram showing a surface shape measuring apparatus according to one embodiment of the present invention. The surface shape measuring apparatus 1 in this embodiment as shown in this figure, which measures the surface shape of a lens or the like, comprises a three dimensional orthogonal coordinate data measuring unit 2 for measuring the surface shape of a measurement object such as the lens, whether in tracer or non-tracer type, as the three dimensional data (x, y, z) around an origin in the three dimensional orthogonal coordinates as predefined, an operation unit 3, surrounded by a block of the dashed line, for calculating the radius of curvature for the surface shape on the basis of the data collected by the three dimensional orthogonal coordinate data measuring unit 2, and a calculated data display unit 4 for displaying the radius of curvature and the like obtained by the operation unit 3.

Herein, the three dimensional orthogonal coordinate data measuring unit 2 and the calculated data display unit 4 are typically used. Accordingly, the description for them is omitted in this specification, and the operation unit 3 that is a feature of the invention will be described below.

The operation unit 3 is composed of a micro computer comprising a CPU, a ROM and a RAM, and realizes the functions corresponding to sections 31 to 36 as will be described later by executing a control program stored in the ROM.

That is, a polar coordinate conversion portion 31 of the operation unit 3 converts the three dimensional data (x, y, z) collected by the three dimensional orthogonal coordinate data measuring unit 2 into the polar coordinate data (z, ρ, θ). An approximate expression calculating portion 32 calculates an approximate expression of the surface shape for a measurement object, on the basis of the polar coordinate data obtained by the polar coordinate conversion portion 31, employing a polynomial for approximating the curved surface. An angle calculating portion 33 calculates an angle θ1 representing the generating line direction and an angle θ2 representing the principal line direction in the surface shape of the measurement object, on the basis of the approximate expression obtained by the approximate expression calculating portion 32.

Also, a first approximate sectional shape calculating portion 34 calculates an approximate sectional shape in the generating line direction and an approximate sectional shape in the principal line direction in the surface shape of the measurement object, on the basis of the angles θ1 and θ2 calculated by the angle calculating portion 33, employing the approximate expression. A second approximate sectional shape calculating portion 35 approximates the first approximate sectional shape in the generating line direction and the first approximate sectional shape in the principal line direction that are calculated by the first approximate sectional shape calculating portion 34 with a quadratic curve, and calculates the center coordinates and the radius of curvature for an approximate quadratic curve for the approximate sectional shape in the generating line direction that is obtained and the center coordinates and the radius of curvature for an approximate quadratic curve for the approximate sectional shape in the principal line direction that is obtained.

Further, a sectional shape data calculating portion 36 calculates an approximate shape of the sectional shape in the generating line direction and an approximate shape of the sectional shape in the principal line direction in the surface shape of the measurement object as the numerical data, on the basis of the center coordinates and the radius of curvature for the approximate quadratic curve obtained in the second approximate sectional shape calculating portion 35. The center coordinates and the radius of curvature obtained in this manner are displayed on the calculated data display unit 4.

In this embodiment, the Zernike's polynomial is employed as the polynomial for approximating the curved surface. The Zernike's polynomial is used in calculating the aberration for an optical system in an interferometer or the like, and represents the height of each coordinate in the polar coordinate system within a unit circle around an origin, with a radius 1 normalized.

Figure 2:
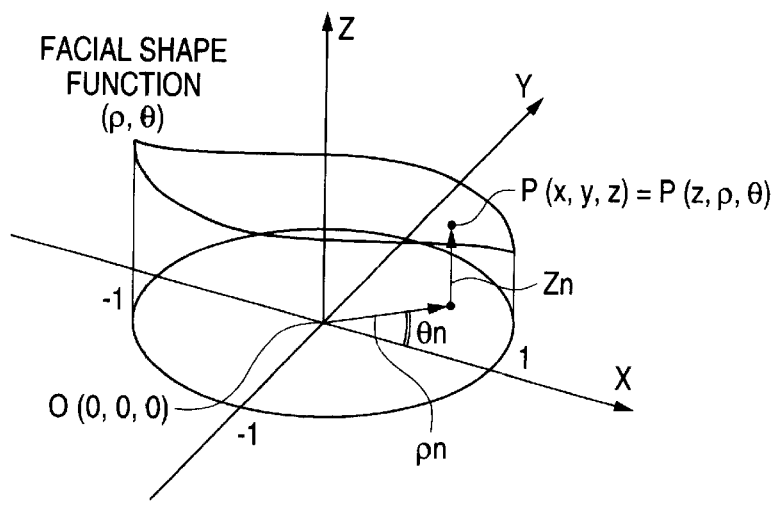
FIG. 2 is an explanatory view for explaining the polar coordinate representation of a facial shape function F(z) having a height z at arbitrary coordinates P on the X-Y plane.

Referring now to FIG. 2, arbitrary coordinates P can be represented in the XYZ orthogonal coordinates (x, y, z) and the polar coordinates (z, ρ, θ). Herein, z in the polar coordinates indicates the height on the XY plane of arbitrary coordinates P, and ρ in the polar coordinates indicates the distance of arbitrary coordinates P on the XY plane from the origin O (0, 0). Also, θ in the polar coordinates indicates the direction of arbitrary coordinates P on the XY plane from the origin O (0, 0). Employing the polar coordinate representation, the facial shape can be represented in the first to ninth terms of the Zernike's polynomial given in the following expression (3) as a facial shape function F(z)=F(ρ, θ).

$$F(\rho, \theta) = Ze_1 \cdot k +$$
$$Ze_2 \cdot \rho \cdot \cos(\theta) +$$
$$Ze_3 \cdot \rho \cdot \sin(\theta) +$$
$$Ze_4 \cdot (2\rho^2 - 1) +$$
$$Ze_5 \cdot \rho^2 \cdot \cos(2\theta) +$$
$$Ze_6 \cdot \rho^2 \cdot \sin(2\theta) +$$
$$Ze_7 \cdot (3\rho^2 - 2) \cdot \rho \cdot \cos(\theta) +$$
$$Ze_8 \cdot (3\rho^2 - 2) \cdot \rho \cdot \sin(\theta) +$$
$$Ze_9 \cdot (6\rho^4 - 6\rho^2 + 1) \quad (3)$$

Where $Ze_1$ to $Ze_9$ are coefficients of the Zernike's polynomial.

Figure 3:
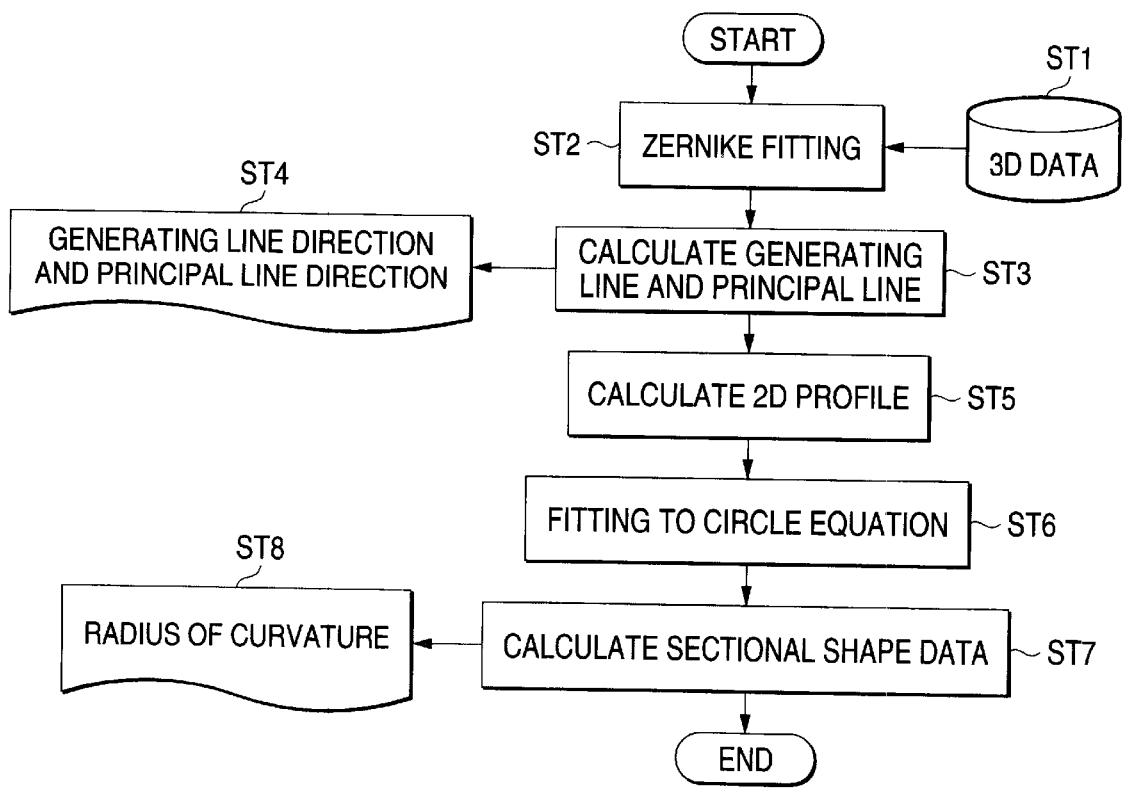
FIG. 3 is a flowchart showing a measuring procedure for the surface shape measuring apparatus of the invention.

A measuring procedure in the surface shape measuring apparatus 1 will be set forth. FIG. 3 is a flowchart showing the measuring procedure.

At step ST1, the three dimensional orthogonal coordinate data measuring unit 2 measures the three dimensional data (x, y, z) in the XYZ orthogonal coordinate representation from the surface of a measurement object having a cylindrical face, for instance.

At step ST2, this three dimensional data (x, y, z) is converted into the polar coordinate data (z, ρ, θ) by the polar coordinate conversion portion 31. The polar coordinate converted data is fitted (Zernike fitting) to the Zernike's polynomial (3) in accordance with the method of least square by the approximate expression calculating portion 32. Thereby, the coefficients $Ze_1$ to $Ze_9$ are calculated.

Figure 4A:
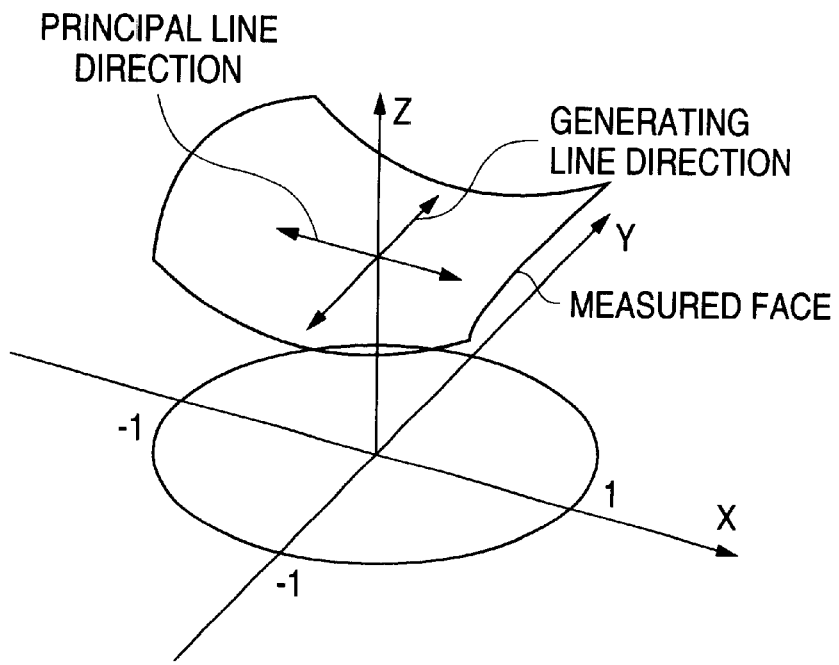
FIG. 4A is an explanatory view showing a curved surface calculated from the measured values measured from the measured object in the XYZ orthogonal coordinates.

Herein, the surface shape to be measured is a cylindrical face, as shown in FIG. 4A, and the curvature and the astigmatism of the shape that is fitted to the Zernike's polynomial (3) including the first to ninth terms in accordance with the method of least square is noted. The angle $θ_1$ representing the generating line direction and the angle $θ_2$ are extracted from an astigmatic direction to calculate a curvature in the generating line direction $θ_1$ and a curve (sectional shape) having the astigmatism as well as a curvature in the principal line direction $θ_2$ and a curve (sectional shape) having the astigmatism.

That is, at step ST3, the angle $θ_1$ in the generating line direction is calculated in accordance with an expression (4) indicating the Seikel's astigmatic coefficients, employing the coefficients $Ze_5$ and $Ze_5$ that are obtained from the fifth term and the sixth term of the Zernike's polynomial (3) in the angle calculating portion 33.

$$θ_1 = 0.5 \cdot \tan^{-1}(Ze_5/Ze_5) \quad (4)$$

Also, the angle $θ_2$ in the principal line direction is different by 90 degrees from the angle $θ_1$ in the generating line direction, and thus can be obtained from an expression (5). The angle $θ_1$ in the generating line direction and the angle $θ_2$ in the principal line direction are output at step ST4.

$$θ_2 = θ_1 + π/2 \quad (5)$$

Next, at step ST5, the approximate sectional shapes (2D profile) in the principal line direction and the generating line direction are calculated by substituting the angle $θ_1$ in the generating line direction and the angle $θ_2$ in the principal line direction (i.e., $θ_1 + π/2$) that are calculated at step ST3 into θ in the Zernike's polynomial (3) in the first approximate sectional shape calculating portion 34. The approximate sectional shape in the generating line direction is represented in accordance with an expression (6).

$F(z \text{ generating line}) = Ze_1 \cdot k +$ $Ze_2 \cdot ρ \cdot \cos(θ_1) +$ $Ze_3 \cdot ρ \cdot \sin(θ_1) +$ $Ze_4 \cdot (2ρ^2 - 1) +$ $Ze_5 \cdot ρ^2 \cdot \cos(2θ_1) +$ $Ze_6 \cdot ρ^2 \cdot \sin(2θ_1) +$ $Ze_7 \cdot (3ρ^2 - 2) \cdot ρ \cdot \cos(θ_1) +$ $Ze_8 \cdot (3ρ^2 - 2) \cdot ρ \cdot \sin(θ_1) +$ $Ze_9 \cdot (6ρ^4 - 6ρ^2 + 1)$ \quad (6)

Similarly, the approximate sectional shape in the principal line direction is represented in accordance with an expression (7).

$F(z \text{ principal line}) = Ze_1 \cdot k +$ $Ze_2 \cdot ρ \cdot \cos(θ_1 + π/2) +$ $Ze_3 \cdot ρ \cdot \sin(θ_1 + π/2) +$ $Ze_4 \cdot (2ρ^2 - 1) +$ $Ze_5 \cdot ρ^2 \cdot \cos(2(θ_1 + π/2)) +$ $Ze_6 \cdot ρ^2 \cdot \sin(2(θ_1 + π/2)) +$ $Ze_7 \cdot (3ρ^2 - 2) \cdot ρ \cdot \cos(θ_1 + π/2) +$ $Ze_8 \cdot (3ρ^2 - 2) \cdot ρ \cdot \sin(θ_1 + π/2) +$ $Ze_9 \cdot (6ρ^4 - 6ρ^2 + 1)$ \quad (7)

Figure 4B:
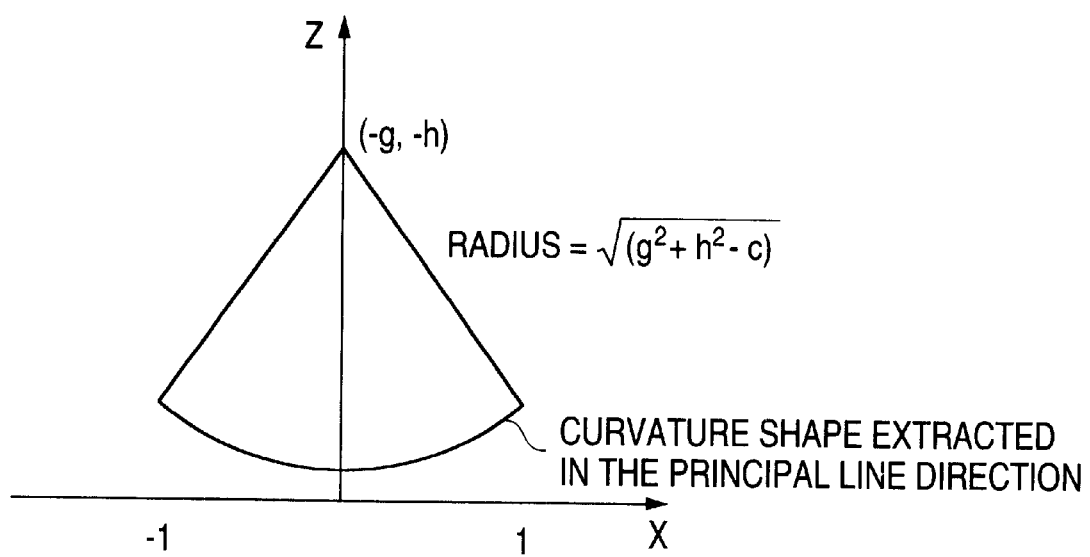
FIG. 4B is an explanatory view showing it in the XZ orthogonal coordinates as seen from the principal line direction.

At step ST6, the approximate sectional shapes in the generating line direction and the principal line direction that are obtained in accordance with the expressions (6) and (7) are approximated with a circle in the second approximate sectional shape calculating portion 35. For instance, the approximate sectional shape in the principal line direction in FIG. 4A is approximated with a circle in the XZ axis coordinates as shown in FIG. 4B. This approximate circle is represented by an expression (8) in which the general expression (1) of the circle is replaced in the XZ axis coordinates. For this general expression (8) of the circle, the approximate sectional shape data in the principal line direction that is obtained from the expression (7) is fitted by the method of least square to acquire the coefficients g, h and c defining the circle, and the center coordinates (−g, −h) of the circle are obtained on the basis of the coefficients g, h and c, whereby the radius of curvature of the circle is calculated in accordance with the expression (2).

$$-c = x^2 + z^2 + 2gx + 2hz \quad (8)$$

Similarly, the approximate sectional shape in the generating line direction is approximated with a circle in the XZ axis coordinates. For the general expression (1) of the circle, the approximate sectional shape data in the generating line direction that is obtained from the expression (6) is fitted by the method of least square to acquire the coefficients g, h and c defining the circle, and the center coordinates (−g, −h) of the circle are obtained on the basis of the coefficients g, h and c, whereby the radius of curvature of the circle is calculated in accordance with the expression (2).

The center coordinates and the radius of curvature for the calculated approximate circle are the result within a unit circle with the radius normalized to 1, and thus calculated as the numerical value data of actual size in the sectional shape data calculating portion 36 at step ST7. This numerical value data is output and displayed on the calculated data display unit 4 at step ST8.

In this manner, in the surface shape measuring apparatus of this embodiment can approximate the surface shape of a measured object with a circle and calculate the surface shape of the measured object as the numerical value, on the basis of the center coordinates and the radius of curvature for the approximate circle, even though the measurement object has the unknown principal line direction or the generating line direction, which was difficult to measure with the conventional configuration.

(Another Embodiment Using the Zernike's Polynomial)

In the previous embodiment, the Zernike's polynomial including the first to ninth terms is employed, but if the higher order terms are used, the surface shape of a cylindrical aspheric surface or toroidal aspheric surface can be calculated as the numerical value precisely.

For instance, if the Zernike's polynomial including up to the 37-th terms is employed, the facial shape function F(z) having the surface shape of cylindrical aspheric surface or toroidal aspheric surface is represented in an expression (9) as follows.

$F(z) = Ze_1 \cdot k$ $+ Ze_2 \cdot \rho \cdot \cos(\theta) +$ $Ze_3 \cdot \rho \cdot \sin(\theta) +$ $Ze_4 \cdot (2\rho^2 - 1) +$ $Ze_5 \cdot \rho^2 \cdot \cos(2\theta) +$ $Ze_6 \cdot \rho^2 \cdot \sin(2\theta) +$ $Ze_7 \cdot (3\rho^2 - 2) \cdot \rho \cdot \cos(\theta) +$ $Ze_8 \cdot (3\rho^2 - 2) \cdot \rho \cdot \sin(\theta) +$ $Ze_9 \cdot (6\rho^4 - 6\rho^2 + 1) +$ $Ze_{10} \cdot \rho^3 \cdot \cos(3\theta) +$ $Ze_{11} \cdot \rho^3 \cdot \sin(3\theta) +$ $Ze_{12} \cdot (4\rho^2 - 3) \cdot \rho^2 \cdot \cos(2\theta) +$ $Ze_{13} \cdot (4\rho^2 - 3) \cdot \rho^2 \cdot \sin(2\theta) +$ $Ze_{14} \cdot (10\rho^4 - 12\rho^2 + 3) \cdot \rho \cdot \cos(\theta) +$ $Ze_{15} \cdot (10\rho^4 - 12\rho^2 + 3) \cdot \rho \cdot \sin(\theta) +$ $Ze_{16} \cdot (20\rho^6 - 30\rho^4 + 12\rho^2 - 1) +$ $Ze_{17} \cdot \rho^4 \cdot \cos(4\theta) +$ $Ze_{18} \cdot \rho^4 \cdot \sin(4\theta) +$ $Ze_{19} \cdot (5\rho^2 - 4) \cdot \rho^3 \cdot \cos(3\theta) +$ $Ze_{20} \cdot (5\rho^2 - 4) \cdot \rho^3 \cdot \sin(3\theta) +$ $Ze_{21} \cdot (15\rho^4 - 20\rho^2 + 6) \cdot \rho^2 \cdot \cos(2\theta) +$ $Ze_{22} \cdot (15\rho^4 - 20\rho^2 + 6) \cdot \rho^2 \cdot \sin(2\theta) +$ $Ze_{23} \cdot (35\rho^6 - 60\rho^4 + 30\rho^2 - 4) \cdot \rho \cdot \cos(\theta) +$ $Ze_{24} \cdot (35\rho^6 - 60\rho^4 + 30\rho^2 - 4) \cdot \rho \cdot \sin(\theta) +$ $Ze_{25} \cdot (70\rho^8 - 140\rho^6 + 90\rho^4 - 20\rho^2 + 1) +$ $Ze_{26} \cdot \rho^5 \cdot \cos(5\theta) +$ $Ze_{27} \cdot \rho^5 \cdot \sin(5\theta) +$ $Ze_{28} \cdot (6\rho^2 - 5) \cdot \rho^4 \cdot \cos(4\theta) +$ $Ze_{29} \cdot (6\rho^2 - 5) \cdot \rho^4 \cdot \sin(4\theta) +$ $Ze_{30} \cdot (21\rho^4 - 30\rho^2 + 10) \cdot \rho^3 \cdot \cos(3\theta) +$ $Ze_{31} \cdot (21\rho^4 - 30\rho^2 + 10) \cdot \rho^3 \cdot \sin(3\theta) +$ $Ze_{32} \cdot (56\rho^6 - 105\rho^4 + 60\rho^2 - 10) \cdot \rho^2 \cdot \cos(2\theta) +$ $Ze_{33} \cdot (56\rho^6 - 105\rho^4 + 60\rho^2 - 10) \cdot \rho^2 \cdot \sin(2\theta) +$ $Ze_{34} \cdot (126\rho^8 - 280\rho^6 + 210\rho^4 - 60\rho^2 + 5) \cdot \rho \cdot \cos(\theta) +$ $Ze_{35} \cdot (126\rho^8 - 280\rho^6 + 210\rho^4 - 60\rho^2 + 5) \cdot \rho \cdot \sin(\theta) +$ $Ze_{36} \cdot (252\rho^{10} - 630\rho^8 + 560\rho^6 - 210\rho^4 + 30\rho^2 - 1) +$ $Ze_{37} \cdot (924\rho^{12} - 2772\rho^{10} + 3150\rho^8 - 1680\rho^6 + 420\rho^4 - 42\rho^2 + 1)$ \hfill (9)

Employing the expression (9), the surface shape of the measurement object can be measured in accordance with the flowchart of FIG. 3.

At step ST1, the three dimensional data (x, y, z) is measured from the surface of a measurement object in the three dimensional orthogonal coordinate data measuring unit 2. At step ST2, this data is converted into the polar coordinate data (z, $\rho$, $\theta$) in the polar coordinate conversion portion 31. The polar coordinate converted data is fitted (Zernike fitting) into the Zernike's polynomial (9) by the method of least square in the approximate expression calculating portion 32, so that the coefficients $Ze_1$ to $Ze_{37}$ are calculated.

At step ST3, the angle $\theta_1$ in the generating line direction is calculated in accordance with an expression (4) indicating the Seikel's astigmatic coefficients, employing the coefficients $Ze_5$ and $Ze_6$ obtained from the fifth term and the sixth term of the Zernike's polynomial (9) in the angle calculating portion 33. Also, the angle $\theta_2$ in the principal line direction is different by 90 degrees from the angle $\theta_1$ in the generating line direction, and thus can be obtained from an expression (5). The angle $\theta_1$ in the generating line direction and the angle $\theta_2$ in the principal line direction are output at step ST4.

At step ST5, the approximate sectional shapes (2D profile) in the principal line direction and the generating line direction are calculated by substituting the angle $\theta_1$ in the generating line direction and the angle $\theta_2$ in the principal line direction (i.e., $\theta_1 + \pi/2$) that are calculated at step ST3 into $\theta$ in the Zernike's polynomial (9) in the first approximate sectional shape calculating portion 34. The approximate sectional shape in the generating line direction is represented in accordance with an expression (10).

$F(z \text{ generating line}) = Ze_1 \cdot k +$ $Ze_2 \cdot \rho \cdot \cos(\theta_1) +$ $Ze_3 \cdot \rho \cdot \sin(\theta_1) +$ $Ze_4 \cdot (2\rho^2 - 1)$ $+ Ze_5 \cdot \rho^2 \cdot \cos(2\theta_1) +$ $Ze_6 \cdot \rho^2 \cdot \sin(2\theta_1) +$ $Ze_7 \cdot (3\rho^2 - 2) \cdot \rho \cdot \cos(\theta_1) +$ $Ze_8 \cdot (3\rho^2 - 2) \cdot \rho \cdot \sin(\theta_1) +$ $Ze_9 \cdot (6\rho^4 - 6\rho^2 + 1) +$ $Ze_{10} \cdot \rho^3 \cdot \cos(3\theta_1) +$ $Ze_{11} \cdot \rho^3 \cdot \sin(3\theta_1) +$ $Ze_{12} \cdot (4\rho^2 - 3) \cdot \rho^2 \cdot \cos(2\theta_1) +$ $Ze_{13} \cdot (4\rho^2 - 3) \cdot \rho^2 \cdot \sin(2\theta_1) +$ $Ze_{14} \cdot (10\rho^4 - 12\rho^2 + 3) \cdot \rho \cdot \cos(\theta_1) +$ $Ze_{15} \cdot (10\rho^4 - 12\rho^2 + 3) \cdot \rho \cdot \sin(\theta_1) +$ $Ze_{16} \cdot (20\rho^6 - 30\rho^4 + 12\rho^2 - 1) +$ $Ze_{17} \cdot \rho^4 \cos(4\theta_1) +$ $Ze_{18} \cdot \rho^4 \cdot \sin(4\theta_1) +$ $Ze_{19} \cdot (5\rho^2 - 4) \cdot \rho^3 \cdot \cos(3\theta_1) +$ $Ze_{20} \cdot (5\rho^2-4) \cdot \rho^3 \cdot \sin(3\theta_1)+$ $Ze_{21} \cdot (15\rho^4-20\rho^2+6) \cdot \rho^2 \cos(2\theta_1)+$ $Ze_{22} \cdot (15\rho^4-20\rho^2+6) \cdot \rho^2 \sin(2\theta_1)+$ $Ze_{23} \cdot (35\rho^6-60\rho^4+30\rho^2-4) \cdot \rho \cdot \cos(\theta_1)+$ $Ze_{24} \cdot (35\rho^6-60\rho^4+30\rho^2-4) \cdot \rho \cdot \sin(\theta_1)+$ $Ze_{25} \cdot (70\rho^8-140\rho^6+90\rho^4-20\rho^2+1)+$ $Ze_{26} \cdot \rho^5 \cdot \cos(5\theta_1)+$ $Ze_{27} \cdot \rho^5 \sin(5\theta_1)+$ $Ze_{28} \cdot (6\rho^2-5) \cdot \rho^4 \cdot \cos(4\theta_1)+$ $Ze_{29} \cdot (6\rho^2-5) \cdot \rho^4 \cdot \sin(4\theta_1)+$ $Ze_{30} \cdot (21\rho^4-30\rho^2+10) \cdot \rho^3 \cdot \cos(3\theta_1)+$ $Ze_{31} \cdot (21\rho^4-30\rho^2+10) \cdot \rho^3 \cdot \sin(3\theta_1)+$ $Ze_{32} \cdot (56\rho^6-105\rho^4+60\rho^2-10) \cdot \rho^2 \cdot \cos(2\theta_1)+$ $Ze_{33} \cdot (56\rho^6-105\rho^4+60\rho^2-10) \cdot \rho^2 \cdot \sin(2\theta_1)+$ $Ze_{34} \cdot (126\rho^8-280\rho^6+210\rho^4-60\rho^2+5) \cdot \rho \cdot \cos(\theta_1)+$ $Ze_{35} \cdot (126\rho^8-280\mu^6+210\rho^4-60\rho^2+5) \cdot \rho \cdot \sin(\theta_1)+$ $Ze_{36} \cdot (252\rho^{10}-630\rho^8+560\rho^6-210\rho^4+30\rho^2-1)+$ $Ze_{37} \cdot (924\rho^{12}-2772\rho^{10}+3150\rho^8-1680\rho^6+420\rho^4-42\rho^2$ $+1)$ (10)

Similarly, the approximate sectional shape in the principal line direction is obtained by substituting the angle $\theta_2$ (i.e., $\theta_1+\pi$) into $\theta$ in the Zernike's polynomial (9).

At step ST6, the approximate sectional shapes in the generating line direction and the principal line direction are approximated with a quadratic curve in the second approximate sectional shape calculating portion 35. Herein, because of the cylindrical aspheric surface or toroidal aspheric surface, the general expression (11) of the quadratic curve is employed.

$$1 = ax^2+2hxz+bz^2+2gx+2fz \quad (11)$$

For this general expression (11) of quadratic curve, the approximate sectional shape data in the generating line direction that is obtained from the expression (10) is fitted by the method of least square to acquire the coefficients a, b, g, h and f defining the curvet and the center coordinates $(x_0, z_0)$ are obtained on the basis of the coefficients a, b, g, h and f in accordance with an expression (12) as follows.

$$(x_0, z_0) = \{(f \cdot h - b \cdot g)/(a \cdot b - h^2), (g \cdot h - a \cdot f)/(a \cdot b - h^2)\} \quad (12)$$

The size (r) is obtained in accordance with an expression (13) as follows.

$$r = 1-(ax_0^2+bz_0^2+2hx_0z_0+2gx_0+2fz_0) \quad (13)$$

Supposing that $s_a$, $s_b$ and $s_c$ are in accordance with the expressions (14), (15) and (16), the major axis size ($k_x$) is represented in accordance with an expression (17), and the minor axis size ($k_z$) is represented in accordance with an expression (18).

$$s_a = a/r \quad (14)$$

$$s_b = b/r \quad (15)$$

$$s_c = c/r \quad (16)$$

$$k_x = \sqrt{(4 \cdot S_b/(4 \cdot s_a \cdot s_b - s_c^2))} \quad (17)$$

$$k_z = \sqrt{(4 \cdot S_a/(4 \cdot s_a \cdot s_b - s_c^2))} \quad (18)$$

On the basis of the major axis size ($k_x$) and the minor axis size ($k_z$) that are calculated, the radius of curvature is calculated in accordance with an expression (19), and the cone constant (cc) is calculated in accordance with an expression (20).

$$\text{radius} = k_x \cdot \sqrt{((k_z^2-k_x^2)/k_z^2)} \quad (19)$$

$$cc = (k_z^2-k_x^2)-1 \quad (20)$$

Similarly, the radius of curvature and the cone constant in the principal line direction are calculated. Thereby, the sectional shapes in the principal line direction and the generating line direction can be obtained in the numerical values as the approximate shapes up to the cone constant.

The radius of curvature for the calculated approximate quadratic curve is the result within a unit circle with the radius normalized to 1, and thus calculated as the numerical value data of actual size in the sectional shape data calculating portion 36 at step ST7. This numerical value data is output and displayed on the calculated data display unit 4 at step ST8. In this way, employing the higher order terms of the Zernike's polynomial, the cone constant can be obtained in addition to the radius of curvature for the cylindrical aspheric surface or toroidal aspheric surface, and the principal line direction and the generating line direction.

As described above, in the surface shape measuring apparatus of the invention, even for a measurement object having the unknown principal line direction or generating line direction, which was difficult to measure with the conventional constitution, the three dimensional orthogonal coordinate data (x, y, z) representing the surface shape data of the measurement object is converted into the polar coordinate data (z, $\rho$, $\theta$), employing the Zernike's polynomial for approximating the curved surface, the generating line direction and the principal line direction for the surface shape of the measurement object are obtained, and the approximate sectional shapes in the generating line direction and the principal line direction are calculated. Further, the first approximate sectional shapes are approximated with the quadratic curves, and the center coordinates and the radiuses of curvature are calculated for the approximate quadratic curves that are the second approximate sectional shapes obtained in the generating line direction and the principal line direction. On the basis of the center coordinates and the radiuses of curvature for the approximate quadratic curves, the approximate shape of sectional shape in the generating line direction and the approximate shape of sectional shape in the generating line direction in the surface shape of the measurement object can be obtained as the numerical data.

The present application is based on Japanese Patent Application No. 2000-369348, the entire contents of which are incorporated herein by reference.

What is claimed is:

1. A surface shape measuring apparatus comprising:
    polar coordinate conversion means for converting surface shape data of a measurement object represented as three dimensional orthogonal coordinate data (x, y, z) into polar coordinate data (z, $\rho$, $\theta$);
    approximate expression calculating means for calculating an approximate expression for the surface shape of the measurement object on the basis of said polar coordinate data, employing a polynomial for approximating a curved surface;

angle calculating means for calculating an angle θ1 representing a generating line direction and an angle θ2 representing a principal line direction in the surface shape of the measurement object in accordance with said approximate expression;

first approximate sectional shape calculating means for calculating first approximate sectional shapes both in the generating line and principal line directions on the surface shape of the measurement object on the basis of said angles θ1 and θ2 employing said approximate expression;

second approximate sectional shapes calculating means for approximating said first approximate sectional shapes to quadratic curves with respect to the three dimensional orthogonal coordinates as second approximate sectional shapes, and calculating center coordinates and radiuses of curvature for said approximate quadratic curves representing said second approximate sectional shapes in the generating line and principal line directions; and sectional shape data calculating means for calculating numerical data of the second approximate sectional shapes both in the generating line and principal line directions and on the surface shape of the measurement object on the basis of the center coordinates and the radiuses of curvature for said approximate quadratic curves.

2. The surface shape measuring apparatus according to claim 1, wherein said approximate expression comprises a Zernike's polynomial including at least up to nine terms.

3. The surface shape measuring apparatus according to claim 1, wherein said surface shape comprises a cylindrical aspheric surface or a toroidal aspheric surface.

4. The surface shape measuring apparatus according to claim 3, wherein the surface shape is measured as three dimensional orthogonal data of the orthogonal coordinate system and converted to the polar coordinate data.

5. A surface shape measuring method comprising the steps of:

converting surface shape data of a measurement object represented as three dimensional orthogonal coordinate data (x, y, z) into polar coordinate data (z, ρ, θ);

calculating an approximate expression for the surface shape of the measurement object on the basis of said polar coordinate data employing a polynomial for approximating a curved surface;

calculating an angle θ1 representing a generating line direction and an angle θ2 representing a principal line direction in the surface shape of the measurement object in accordance with said approximate expression;

calculating first approximate sectional shapes both in the generating line and principal line directions on the surface shape of the measurement object on the basis of the calculated angles θ1 and θ2, employing said approximate expression;

approximating the first approximate sectional shapes both in the generating line and principal line directions to quadratic curves with respect to the three dimensional orthogonal coordinates as second approximate sectional shapes and calculating respective center coordinates and radiuses of curvature for said approximate quadratic curves; and calculating numerical data of the second approximate sectional shapes both in the generating line and principal line directions in the surface shape of the measurement object, on the basis of the center coordinates and the radiuses of curvature for said approximate quadratic curves.

6. The surface shape measuring method according to claim 5, wherein said approximate expression comprises a Zernike's polynomial including at least up to nine terms.

7. The surface shape measuring method according to claim 5, wherein the surface shape comprises a cylindrical aspheric surface or a toroidal aspheric surface.

8. The surface shape measuring method according to claim 7, wherein the surface shape is measured as three dimensional orthogonal data of the orthogonal coordinate system and converted to the polar coordinate data.

* * * * *